Oct. 31, 1967     A. G. TROKA     3,350,108

KEYLESS CHUCKS

Filed June 1, 1965

INVENTOR
Albin G. Troka

Leonard S. Knox
Att'y

United States Patent Office 3,350,108
Patented Oct. 31, 1967

3,350,108
KEYLESS CHUCKS
Albin G. Troka, Des Plaines, Ill., assignor to Supreme Products Corporation, Chicago, Ill.
Filed June 1, 1965, Ser. No. 460,161
7 Claims. (Cl. 279—58)

This invention relates to machine chucks, particularly "keyless" chucks. More specifically it relates (1) to means for overcoming the tendency of the jaws of the chuck to loosen, not only while drilling but during idling and (2) to means for preventing jamming of certain of the chuck parts when the jaws are fully opened.

The term "keyless" is commonly used to distinguish a chuck which is tightened and loosened by gripping with the hand from one, say of the Jacobs' type, which utilizes a key for the purpose. Keyless chucks are preferred where the work piece must be operated upon with a high degree of accuracy. Such chucks are manufactured with a high order of precision in order that the tool gripped therein may be centered to a corresponding degree, i.e. eccentricity and/or wobble are reduced to an absolute minimum. On the other hand, a key-operated chuck is capable of having a substantial torque applied which cannot only distort the jaws and associated mechanism to cause eccentric location of the tool or wobble due to unequal closing of the jaws, or to damage the shank of the tool. Grinding of areas thus damaged can easily put the shank out-of-round.

Keyless chucks, when manufactured to a high degree of precision, can be hand-tightened to grip the tool adequately but not to the degree obtainable with a key-operated chuck. Accordingly, any pulsating motion of the drill-press spindle, upon which the chuck is mounted, for example, such as may be due to fluctuations in the tension of a driving belt, combined with the reaction of the tool on the work piece can be fed to the chuck mechanism. It appears that the flywheel effect of the chuck and the tool mounted therein will, due to the pulsation, tend to hunt, and the intermittent impulses act on the mass of the chuck sleeve and the parts integral therewith, whereby loosening occurs. Further, variation in the cutting action of the tool may contribute to loosening of the chuck. In precision operations such behaviour is intolerable.

Moreover, since the parts of keyless chucks are ground to fine tolerances they coact with very little friction. Thus, loosening of the chuck, whether simply to release a tool or to open the jaws to their maximum capacity, can be accomplished by "spinning," so to speak, the sleeve which actuates the jaws. As a result the screw which actuates the jaws in and out may be rotated to its limit and will jam. This unwanted behaviour can result either from the flywheel effect of the jaw-actuating sleeve or over-driving thereof by the operator.

In one aspect, the present invention has for an object the provision of means to overcome the propensity of the chuck to loosen during use and, in another aspect, to obviate jamming when the sleeve is rotated to its limit upon loosening of the jaws.

The invention comprehends a keyless chuck having a body to secure the chuck on the spindle of the drill press, jig borer or the like. Usually a Morse taper bore in the body frictionally grips a complementary end of the spindle. The body which, for convenience, is referred to as the fixed part of the chuck, i.e., is non-rotatable when the spindle is static, carries a plurality of jaws slidably supported in the body for movement as a set into a position to grip the shank of the tool. In one type of chuck to which the principles of the invention are applicable the jaws are actuated by an axially-movable screw having a head connected to the inner end of the jaws. The nut for the screw is provided in the fixed part of the chuck. The jaws are guided for combined axial and radial movement in a rotatable part to which an exterior sleeve is secured. Thus, by virtue of the operative connection between the jaws and screw operation of the screw up or down will close or open the jaws. Since the natural way of closing the jaws is by clockwise rotation of the sleeve (viewed facing the spindle end of the chuck) the thread on the nut and screw is left-handed. In accordance with one aspect of the invention resilient means are provided between the head of the screw and the several jaws so that the locking force thereof is only partially through metal-to-metal contact and to a large extent through the stressed condition of the resilient means. Thus when the jaws are fully tightened the resulting abutment between the head and jaws does not involve two hardened surfaces incapable of absorbing vibration, but rather one which is of a yielding character and therefore capable of absorbing vibration. Accordingly forces of vibration and/or pulsation, to which the chuck may be subjected, are ineffective to jar the jaws loose. In its other aspect the invention includes a feature to obviate jamming of the parts of the chuck when the same has been fully opened. Such jamming occurs when the head of the screw abuts a shoulder designed to limit upward movement thereof. Stated otherwise, the wedging action inherent in a screw thread accompanied by the precise fit of the parts and flywheel action of the jaw-actuating sleeve may force the screw into a jammed condition which, sometimes, is of such degree as to resist loosening by hand. In such cases the operator may use a mallet or wrench to release the sleeve. Obviously, in the case of a precision device such abuse is to be avoided. To this end there is interposed between the head of the screw and the shoulder it is to abut, a resilient washer which cushions the axial movement of the screw and avoids the undesirable metal-to-metal jam-inducing pressure.

Additional objects and advantages of the inventions will become apparent from the ensuing description which, taken with the accompanying drawing, discloses various forms in which the inventions may be embodied in practice.

Figure 1:
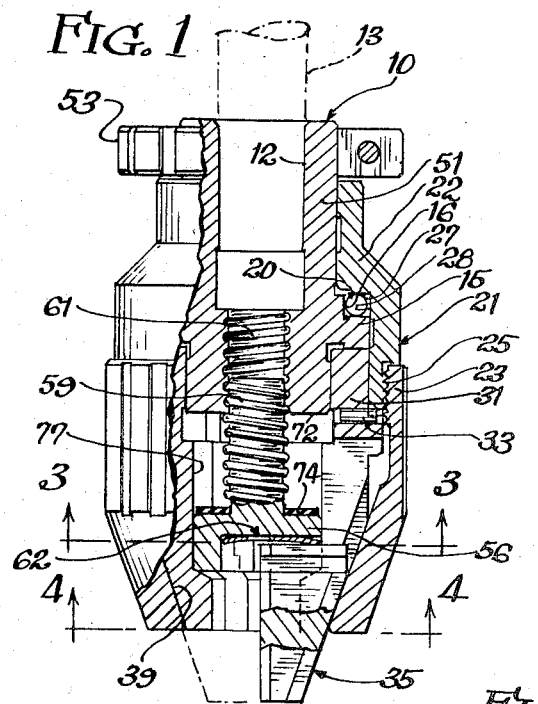
FIG. 1 is principally a vertical, medial, cross-sectional view through a chuck embodying the invention improvements.

Broadly regarded, the invention, in one aspect, comprises improvements in a keyless chuck, wherein the jaws, as a set, are operatively associated with a common member which, upon actuation, moves the jaws between tool-holding and tool-releasing positions. The jaws and common member are connected in a manner permitting combined radial and axial movement of the jaws as the common member is moved axially. In general, the common member has a screw-threaded shank engaged in a nut in the relatively fixed part of the chuck body while the jaws and common member are rotated by a sleeve exteriorly of the chuck, the jaws being suitably guided in the rotatable sleeve. In accordance with the invention a resilient element is interposed between the inward end of each jaw and that portion of the common member with which the same is linked. The resilient elements are desirably in the form of leaf springs formed as branches of a common support and are adapted to exert some predetermined axially-directed force on the jaws when the same are tightened on the tool held thereby. In another aspect the invention comprehends the interposition between the common jaw-actuating member and a fixed part of the chuck against which the said member would otherwise abut at the upward limit of its travel, of an elastic element to preclude jamming when the said member is moved to said limit.

Adverting to the drawing there is shown, by way of example a keyless chuck comprising a relatively fixed body 10 having a tapered bore 12 to mate with the correspondingly tapered end 13 of a drill press spindle, e.g., a Morse taper. The body 10 is provided with an annular flange 15 and an annular shoulder 16 which, together serve as one race of an anti-friction bearing including a plurality of balls 20. A rotatable sleeve 21 comprises, for convenience of manufacture, two parts, an upper one 22 and a lower one 23 interlocked by threads 25. The part 22 has a pair of annular shoulders 27 and 28 providing the other race of the bearing, by means of which the sleeve 21 may be rotated with minimum friction.

Figure 4:
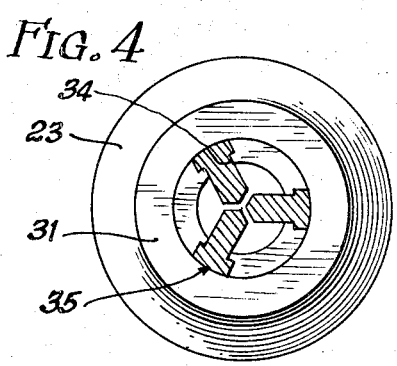
FIG. 4 is a cross section taken on the line 4—4 of FIG. 1.
Figure 8:
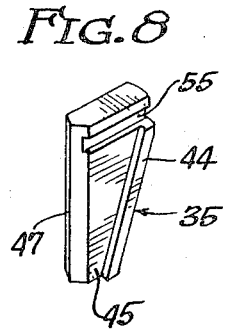
FIG. 8 is a perspective view of one of the jaws.

An inner body portion 31 is keyed to the upper sleeve portion 22 by a pin 33. Body portion 31 is provided with a plurality of slots 34, in this case three, to receive individual jaws 35. To insure proper guidance of the jaws the slots 34 are T-shaped in transverse cross-section (FIG. 4) and the jaws have a complementary cross section. Thus the jaws are retained in an inward-going sense during their travel. Retention of the jaws in an outward-going sense is provided by the frusto-conical interior face portion 39 at the lower end of the sleeve part 23. The lower portion 41 of the body 31 is also formed complementarily with the face portion 39, as is the outer face of each the of the jaws 35. The T-shaped configuration of the jaws 35 necessitated by the T-shaped guide slots 34 is best seen in FIG. 8, the head of the T being indicated at 44, and the stem thereof at 45. Numeral 47 indicates the tool-gripping edge. Thus, when the jaws are converged, by means to be described, they undergo uniform radial inward and outward movement to cause the three edges 47 to grip the tool (FIG. 4) as will be understood and, vice versa, to release the same.

The upper part 51 of the body 10 which contains the aperture 12 is, for convenience, referred to as the fixed part of the chuck, whereas the lower part 31, together with the sleeve 21, which rotates relatively thereto, is sometimes referred to as the rotatable part. Desirably the part 51 carries a clamp-ring 53 having a grooved outer surface whereby the operator may restrain rotation thereof with one hand while rotating the sleeve 21 with the other.

Figure 2:
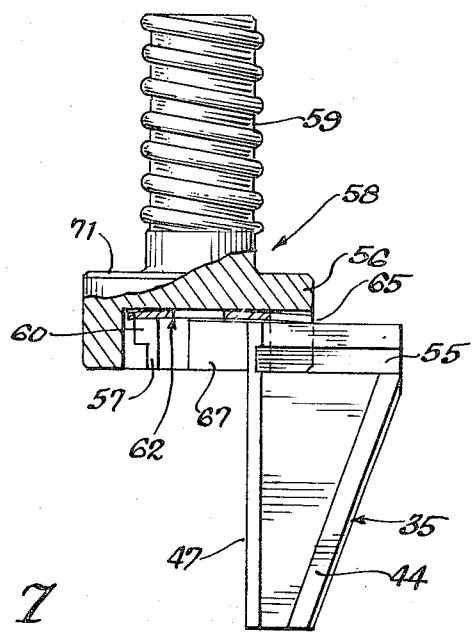
FIG. 2 is a detail of the jaw-actuating screw together with one of the jaws and the jaw-biasing spring.

Each jaw 35 is provided at the top with a groove 55 slidably engaged with a complementary tongue 57 on the head 56 (FIG. 2) of a common jaw-actuating member 58, that portion of the jaw adjacent the groove 55 interfitting a recess 60 adjacent the tongue 57. Thus, the jaws are retained in an axial sense while moving radially to tool-gripping position and vice versa. The member 58 has a threaded shank 59 engaged in a threaded bore 61 in the fixed body part 51. Accordingly upon rotation of the sleeve 21 the jaws are carried therewith and, in turn, rotate the member 58 which, by reason of the threaded connection traverses the member and the thereto-connected jaws axially in one direction or the other.

Figure 5:
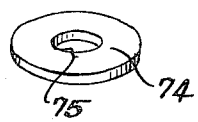
FIG. 5 is a top plan view of the jaw-biasing spring.
Figure 6:
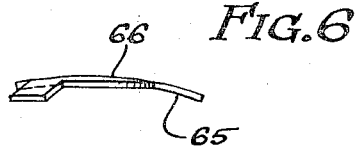
FIG. 6 is a side view thereof.

As mentioned hereinabove the jaws, in prior keyless chucks of the character here involved, tend to lose their grip on the tool. To overcome this tendency there is interposed between the upper face of each jaw 35 and the bottom of its associated recess 60, a resilient element 65 (FIGS. 2, 5 and 6) each formed, in the example, as radial projections from a common support 66, the combination being indicated by the numeral 62.

Each projection acts in the manner of a leaf spring, but for convenience of fabrication and assembly a dished washer form is preferred. Any suitable spring steel is suitable. The several projections 65 each fit into an individual one of the recesses 60, to take up a position intermediate the upper face of each jaw and the floor of the recess and the common member 66 being received in a counterbore 67 in the head 56. The degree of bowing imparted to the element 62 is such as to apply adequate axially-directed force, viz. bias, against the jaws, whereby the loosening action heretofore mentioned may be precluded. If desired to hole 68 may be provided centrally of the element 62 to clear the shank end of the tool, such as a drill, and to improve the elastic response of the element. The fit between the jaws 35 and the mating portions of the head 56, such as the tongue 57 and recess 60, when considered with the thickness of the projection 65 will be so selected as to permit some acceptable play, whereby the projections may exert useful force on the jaws to perform the function described.

Figure 7:
FIG. 7 is a perspective view of the anti-jamming washer.
Figure 3:
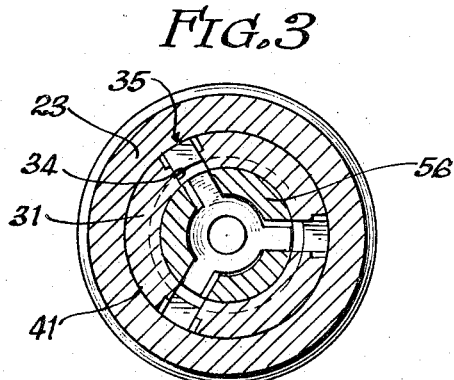
FIG. 3 is a cross section taken on the line 3—3 of FIG. 1.

In order to avoid jamming between the upper face 71 of the head 56 and the confronting wall 72 of the body part 51 there is provided, in accordance with the invention, a washer 74 (FIGS. 1 and 7) of rubber or other elastic material, the opening 75 providing a reasonably good fit over the threaded shank 59, and the outside diameter being sufficient less than the diameter of the wall 77 against which the periphery of the head 56 slides in order that the edge of the washer may not interfere. It will have become apparent that when the head 56 is driven to its upper limit, the motion is terminated by the elastic resistance of the washer 74 and jamming thereby avoided.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

I claim:

1. In a machine chuck having a body, a plurality of jaws mounted for sliding movement with respect to the body between two positions to grip or to release the tool held thereby, a common member movable in said body to actuate the jaws as a set between said two positions, means to operate said common member, said common member and jaws having respective male and female connecting means; the improvement which comprises: an elastic element interposed between each of said male and female means exerting resilient bias between the common member and jaws.

2. The improvement in accordance with claim 1 wherein said male and female means comprises a tongue on each jaw and a respective recess in the common member for relative sliding movement between the jaws and common member.

3. The improvement in accordance with claim 1 further characterized in that the elastic element individual to each jaw is an integral part of a common element.

4. The improvement in accordance with claim 1 in which the elastic element is a dished disc having radial projections, one individual to each jaw.

5. A combination in accordance with claim 1 in which the fit between the male and female connecting means has a predetermined degree of play.

6. In a machine chuck having a body, a plurality of jaws mounted for sliding movement with respect to the body between two positions to grip or to release the tool held thereby, a common member movable in said body to actuate the jaws as a set between said two positions, means interconnecting said jaws and common member, means to operate said common member, said common member having a head including a face confronting a face of the body; the improvement which comprises: a resilient element interposed between said head and said confronting face to preclude metal-to-metal contact between the head and face when said common jaw-operating member is actuated toward said face.

7. The improvement in accordance with claim 6 wherein said common jaw operating member is provided with a threaded shank extending from said head in the direction of said face engaged with a complementary nut in the body, and said resilient element is a washer surrounding said shank and adjacent said head.

References Cited

UNITED STATES PATENTS 1,926,760   9/1933   Albrecht _____ 279—55
2,679,378   5/1954   Uhler _____ 251—330

ROBERT C. RIORDON, *Primary Examiner.*

E. A. CARPENTER, *Assistant Examiner.*